United States Patent
Lee

(10) Patent No.: US 7,905,814 B2
(45) Date of Patent: Mar. 15, 2011

(54) SHIFT CONTROL METHOD OF AN AUTOMATIC TRANSMISSION

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 618 days.

(21) Appl. No.: 11/956,713

(22) Filed: Dec. 14, 2007

(65) Prior Publication Data

US 2009/0042694 A1 Feb. 12, 2009

(30) Foreign Application Priority Data

Aug. 7, 2007 (KR) .................. 10-2007-0079204

(51) Int. Cl.
*F16H 61/06* (2006.01)
*G06F 7/00* (2006.01)

(52) U.S. Cl. ......................... 477/144; 701/66

(58) Field of Classification Search .............. 477/128, 477/130, 131, 143, 144; 701/64, 66
See application file for complete search history.

(56) References Cited

U.S. PATENT DOCUMENTS

| | | | | |
|---|---|---|---|---|
| 6,270,444 | B1 * | 8/2001 | Tsutsui et al. | 477/143 |
| 6,616,560 | B2 * | 9/2003 | Hayabuchi et al. | 475/116 |
| 6,626,786 | B2 * | 9/2003 | Hayabuchi et al. | 475/127 |
| 7,713,170 | B2 * | 5/2010 | Jeon | 477/162 |
| 2004/0043857 | A1 * | 3/2004 | Nishida et al. | 475/125 |

* cited by examiner

*Primary Examiner* — Roger Pang
(74) *Attorney, Agent, or Firm* — Morgan, Lewis & Bockius LLP

(57) ABSTRACT

A shift control method of an automatic transmission for controlling a shift from an $n^{th}$ speed, achieved by engagement of first and second frictional elements to an $(n-3)^{th}$ speed, achieved by engagement of third and fourth frictional elements. The method includes (a) beginning release control of the first element; (b) beginning release control of the second element after step (a) and after the shift is completed; (e) beginning engagement control of the third element; and (d) beginning engagement control of the fourth element after step (c). An alternative method includes (a) beginning release control of the first element; (b) beginning engagement control of the third element after step (a); (c) beginning actual engagement of the third element; (d) beginning actual release of the first element after step (c); (e) beginning engagement control of the fourth element after step (d); (f) beginning release control of the second element after step (e).

17 Claims, 4 Drawing Sheets

| shift speed | C1 | C2 | C3 | C4 | B1 | B2 | F1 |
|---|---|---|---|---|---|---|---|
| D1 | ● |  |  |  | ○ |  | ● |
| D2 | ● |  |  |  |  | ● |  |
| D3 | ● | △(variable type) |  | ● |  |  |  |
| D4 | ● |  | ● |  |  |  |  |
| D5 |  |  | ● | ● |  |  |  |
| D6 |  | ● | ● |  |  |  |  |
| D7 |  |  | ● |  |  | ● |  |
| D8 |  |  | ● |  | ● |  |  |
| REV1 |  |  |  | ● | ● |  |  |

SHIFT CONTROL METHOD OF AN AUTOMATIC TRANSMISSION

CROSS-REFERENCE TO RELATED APPLICATION

This application claims priority to, and the benefit of, Korean Patent Application No. 10-2007-0079204, filed in the Korean Intellectual Property Office on Aug. 7, 2007, the entire contents of which are incorporated herein by reference.

BACKGROUND OF THE INVENTION (a) Field of the Invention

The present invention relates a shift control method for shifting an automatic transmission from an $n^{th}$ speed to an $(n-3)^{th}$ speed.

(b) Description of the Related Art

Generally, to shift gears, one frictional element is released and another frictional element is engaged. However, during some skip-shifting processes, two frictional elements may be released and two other frictional elements may be engaged, which is a difficult procedure.

As an example, in a $6^{th} \rightarrow 3^{rd}$ ship shifting process, one solution is to shift $6^{th} \rightarrow 4^{th} \rightarrow 3^{rd}$. This takes longer than shifting all at once, and is detrimental to shift feel.

The above information disclosed in this Background section is only for enhancement of understanding of the background of the invention and therefore it may contain information that does not form the prior art that is already known in this country to a person of ordinary skill in the art.

SUMMARY OF THE INVENTION

A shift control method of an automatic transmission for controlling a shift from an $n^{th}$ shift speed, achieved by engagement of a first and a second frictional element, to an $(n-3)^{th}$ shift speed, achieved by engagement of a third and a fourth frictional element. The method includes (a) beginning release control of the first frictional element; (b) beginning release control of the second frictional element after step (a) and after the shift is determined to be completed; (c) beginning engagement control of the third frictional element; and (d) beginning engagement control of the fourth frictional element after step (c).

After step (b) hydraulic pressure of the second frictional element may be reduced to a neutral state.

The shift may be determined to be completed when a predetermined shifting time has passed since the shift signal from the $n^{th}$ shift speed to the $(n-3)^{th}$ shift speed was inputted.

Step (c) may begin after step (a) begins, and the method may further include (e) actually engaging the third frictional element; and (f) beginning actual release of the first frictional element after step (e).

Step (a) may begin when the shift signal from the $n^{th}$ shift speed to the $(n-3)^{th}$ shift speed is inputted.

Step (c) may begin when a first predetermined time has passed since the shift signal from the N shift speed to the N−3 shift speed was inputted.

Step (e) may begins when a current turbine speed reaches a first predetermined turbine speed. Step (f) may begin when a current turbine speed reaches a second predetermined turbine speed. Step (d) may begin when a current turbine speed reaches a third predetermined turbine speed.

Actual engagement of the fourth frictional element may begin when the shift is determined to be completed.

An alternative method includes (a) beginning release control of the first frictional element; (b) beginning engagement control of the third frictional element after step (a); (c) beginning actual engagement of the third frictional element; (d) beginning actual release of the first frictional element after step (e); (e) beginning engagement control of the fourth frictional element after step (d); and (f) beginning release control of the second frictional element after step (e).

This method may also include (g) beginning actual engagement of the fourth frictional element. Steps (f) and (g) may be simultaneous and may begin when the shift is determined to be completed.

The method may also include beginning to reduce a hydraulic pressure of the second frictional element to a neutral state after step (f).

Step (a) may begin when the shift signal from the $n^{th}$ shift speed to the $(n-3)^{th}$ shift speed is inputted. Step (b) may begin when a first predetermined time has passed since the shift signal was inputted. Step (c) may begin when a current turbine speed reaches a first predetermined turbine speed. Step (d) may begin when a current turbine speed reaches a second predetermined turbine speed. Step (e) may begin when a current turbine speed reaches a third predetermined turbine speed.

DETAILED DESCRIPTION OF PREFERRED EMBODIMENTS

An exemplary embodiment of the present invention will hereinafter be described in detail with reference to the accompanying drawings.

Figures 1, 2:
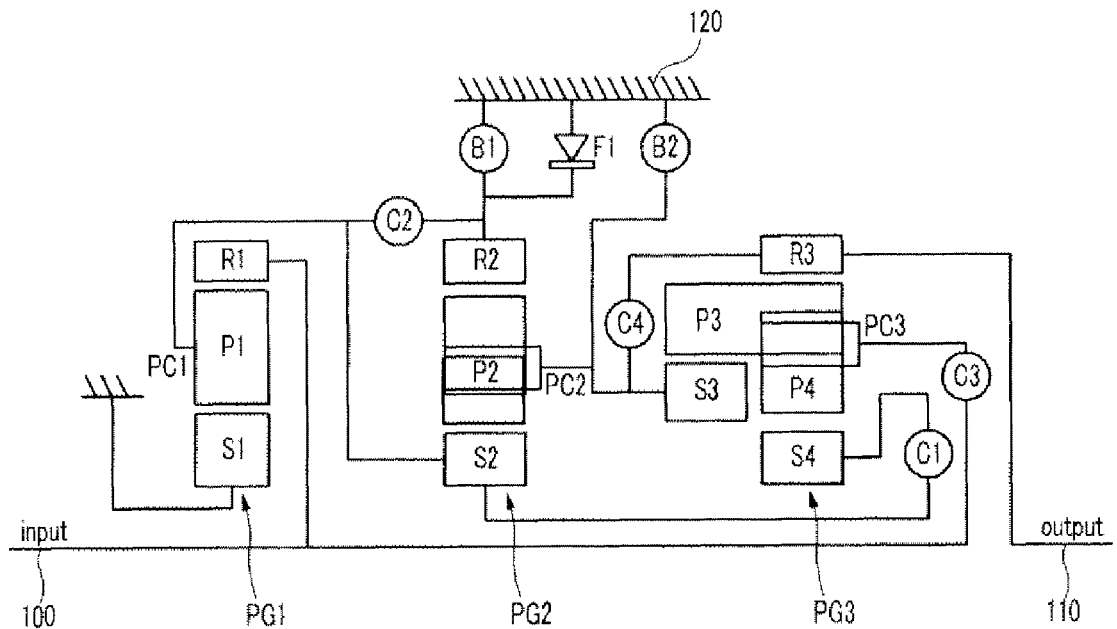
FIG. 1 is a schematic diagram showing a power train of an automatic transmission according to an exemplary embodiment of the present invention.
FIG. 2 is an operational chart of a power train of an automatic transmission according to an exemplary embodiment of the present invention.

As shown in FIG. 1, a power train of an automatic transmission includes firsts second, and third planetary gear sets PG1, PG2, and PG3.

The first planetary gear set PG1 is a single pinion planetary gear set, and has a first sun gear S1, a first planet carrier PC1, and a first ring gear R1. A first pinion gear P1 is engaged with the first ring gear R1 and the first sun gear S1.

The second planetary gear set PG2 is a double pinion planetary gear set, and has a second sun gear S2, a second planet carrier PG2, and a second ring gear R2. A second pinion gear P2 is engaged with the second ring gear R2 and the second sun gear S2.

The third planetary gear set PG3 is a Ravigneaux planetary gear set, and has a third sun gear S3, a fourth sun gear S4, a third planet carrier PC3, and a third ring gear R3. A third pinion gear P3 is engaged with the third ring gear R3 and the third sun gear S3, and a fourth pinion gear P4 is engaged with the third ring gear R3 and the fourth sun gear S4.

In addition, the power train includes an input shaft 100 for receiving torque from an engine (not shown), an output gear 110 for outputting torque from the power train, and a transmission case 120.

The first planet carrier PC6 is fixedly connected to the second sun gear S2. The second planet carrier PC2 is fixedly connected to the third sun gear S3. The first ring gear R1 is fixedly connected to the input shaft 100 and always operates as an input member. The third ring gear R3 is fixedly connected to the output gear 110 and always operates as an output member. The first sun gear S1 is fixedly connected to the transmission case 120 and is always stopped.

The second sun gear S2 is selectively connected to the fourth sun gear S4 via a first clutch C1. The fixedly connected first planet carrier PC1 and the second sun gear S2 are selectively connected to the second ring gear R2 via a second clutch C2. The third planet carrier PC3 is selectively connected to the input shaft 100 via a third clutch C3. The fixedly connected second planet carrier PC2 and the third sun gear S3 are selectively connected to the third ring gear R3 via a fourth clutch C4. The second ring gear R2 is selectively connected to the transmission case 120 via a first brake B1. The fixedly connected second planet carrier PC2 and the third sun gear S3 are selectively connected to the transmission case 120 via a second brake B2.

In addition, a one-way clutch F1 is disposed between the second ring gear R1 and the transmission case 120 in parallel with the first brake B1.

As shown in FIG. 2, the first clutch C1 and the one-way clutch F1 are operated in a first forward speed D1, the first clutch C1 and the second brake B2 are operated in a second forward speed D2, the first clutch C1 and the fourth clutch C4 are operated in a third forward speed D3, the first clutch C1 and the third clutch C3 are operated in a fourth forward speed D4, the third clutch C3 and the fourth clutch C4 are operated in a fifth forward speed D5, the second clutch C2 and the third clutch C3 are operated in a sixth forward speed D6, the third clutch C3 and the second brake B2 are operated in a seventh forward speed D7, the third clutch C3 and the first brake B1 are operated in an eighth forward speed D8, and the fourth clutch C4 and the first brake B1 are operated in a reverse speed REV. 1.

In FIG. 2, the term "variable type" (the second clutch C2 in the third forward speed D3) refers to the fact that the second clutch C2 is not used in the third forward speed D3, but is used in a shifting process to the third forward speed D3.

Figure 3:
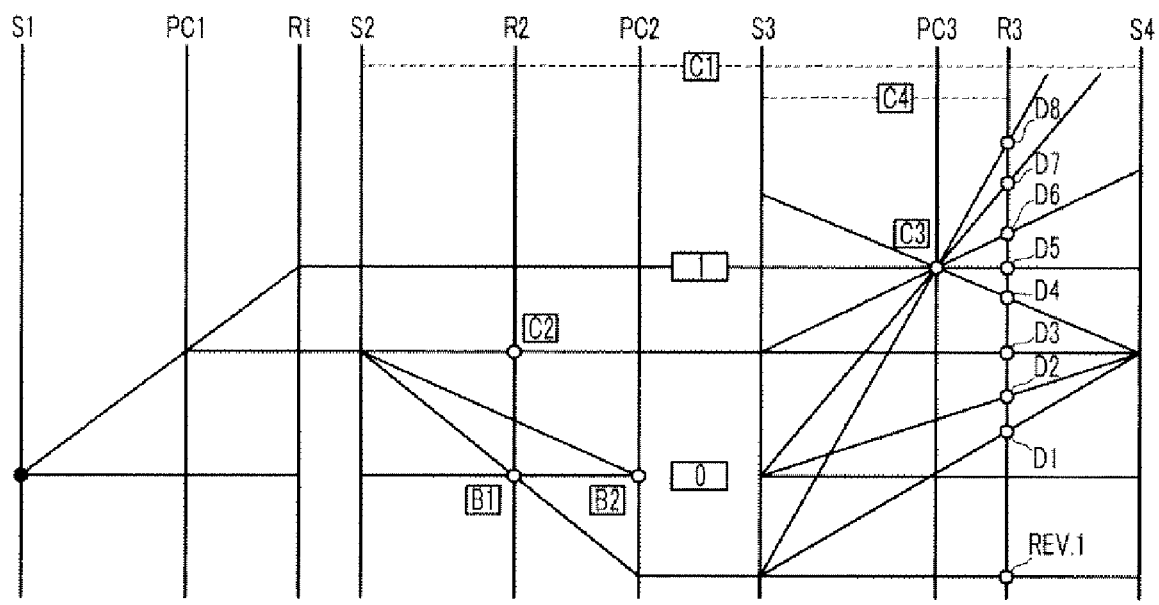
FIG. 3 is a lever diagram showing shifting processes according to an exemplary embodiment of the present invention.

As shown in FIG. 3, since the first sun gear S1 is always stopped and the first ring gear R1 rotates with the same speed as the input shaft 100, the first planet carrier PC1 always rotates with a reduced rotation speed, i.e. slower than a rotation speed of the input shaft. The reduced rotation speed is transmitted to the second sun gear S2 fixedly connected to the first planet carrier PC1.

In the first forward speed D1, the one-way clutch F1 is operated and the second ring gear R2 stops. Therefore, the second planet carrier PC2 rotates in a reverse rotation speed by operation of the second sun gear S2 and the second ring gear R2, and the reverse rotation speed is transmitted to the third sun gear S3 fixedly connected to the second planet carrier PC2. In addition, the reduced rotation speed of the second sun gear S2 is transmitted to the fourth sun gear S4 by operation of the first clutch C1. Therefore, the first forward speed D1 is achieved at the third ring gear R3, which is the output member.

In the second forward speed D2, the reduced rotation speed of the second sun gear S8 is transmitted to the fourth sun gear S4 by operation of the first clutch C1. In addition, the second planet carrier PC2 is stopped by operation of the second brake B2, and the third sun gear S3 fixedly connected to the second planet carrier PC2 is also stopped. Therefore, the second forward speed D2 is achieved at the third ring gear R3, which is the output member.

In the third forward speed D3, the reduced rotation speed of the second sun gear S2 is transmitted to the fourth sun gear S4 by operation of the first clutch C1. In addition, the third sun gear S3 is connected to the third ring gear R3 by operation of the fourth clutch C4 such that all operating members of the third planetary gear set PG3 rotate with the same speed. Therefore, the third forward speed D3 is achieved at the third ring gear R3, which is the output member.

Meanwhile even if the second clutch C2 is operated in the third forward speed D3, output does not change. If the second clutch C2 is operated, all operating members of the second planetary gear set PG2 rotate with the same speed. That is, all operating members of the second planet carrier PC2 rotate with the reduced speed, which is transmitted to the third sun gear S3. However, since all operating members of the third planetary gear set PG3 rotate with the reduced rotation speed by operation of the fourth clutch C4, output does not change by operation of the second clutch C2. In other words, a frictional element that operates in a shifting process and has no effect on the output at a shift speed is referred to as a variable frictional element; the second clutch C2 in the third forward speed D3 acts as a variable frictional element.

In the fourth forward speed D4, the reduced rotation speed of the second sun gear S2 is transmitted to the fourth sun gear S4 by operation of the first clutch C1. In addition, the third planet carrier PC3 rotates with the same speed as the input shaft 100 by operation of the third clutch C3. Therefore, the fourth forward speed D4 is achieved at the third ring gear R3, which is the output member.

In the fifth forward speed D5, the third planet carrier PC3 rotates with the same speed as the input shaft 100 by operation of the third clutch C3. In addition, the third sun gear S3 is connected to the third ring gear R3 by operation of the fourth clutch C4, and all operating members of the third planetary gear set PG3 rotate with the same speed. Therefore, the fifth forward speed D5 is achieved at the third ring gear R3, which is the output member.

In the sixth forward speed D6, all operating members of the second planetary gear set PG2 rotate with the reduced speed by operation of the second clutch C2, and the reduced speed is transmitted to the third sun gear S3. In addition, the third planet carrier PC3 rotates with the same speed as the input shaft 100 by operation of the third clutch C3. Therefore, the sixth forward speed D6 is achieved at the third ring gear R3, which is the output member.

In the seventh forward speed D7, the third planet carrier PC3 rotates with the same speed as the input shaft 100 by operation of the third clutch C3. In addition, the second planet carrier PC2 is stopped by operation of the second brake B2, and the third sun gear S3 fixedly connected to the second planet carrier PC2 is also stopped. Therefore, the seventh forward speed D7 is achieved at the third ring gear R3, which is the output member.

In the eighth forward speed D8, the third planet carrier PC3 rotates with the same speed as the input shaft 100 by operation of the third clutch C3. In addition, the second ring gear R2 is stopped by operation of the first brake B1. Therefore, the second planet carrier PC2 rotates with the reverse speed by operation of the second sun gear S2 and the second ring gear R2, and the reverse speed is transmitted to the third sun gear S3 fixedly connected to the second planet carrier PC2. Therefore, the eighth forward speed D8 is achieved at the third ring gear R3, which is the output member.

In the reverse speed REV. 1, the second ring gear R2 is stopped by operation of the first brake B1. Therefore, the second planet carrier PC2 rotates with the reverse speed by operation of the second sun gear S2 and the second ring gear R2, and the reverse speed is transmitted to the third sun gear S3 fixedly connected to the second planet carrier PC2. In addition, the third sun gear S3 is connected to the third ring gear R3 by operation of the fourth clutch C4, and all operating members of the third planetary gear set PG3 rotate with the same speed. Therefore, the reverse speed REV. 1 is achieved at the third ring gear R3, which is the output member.

Figure 4:
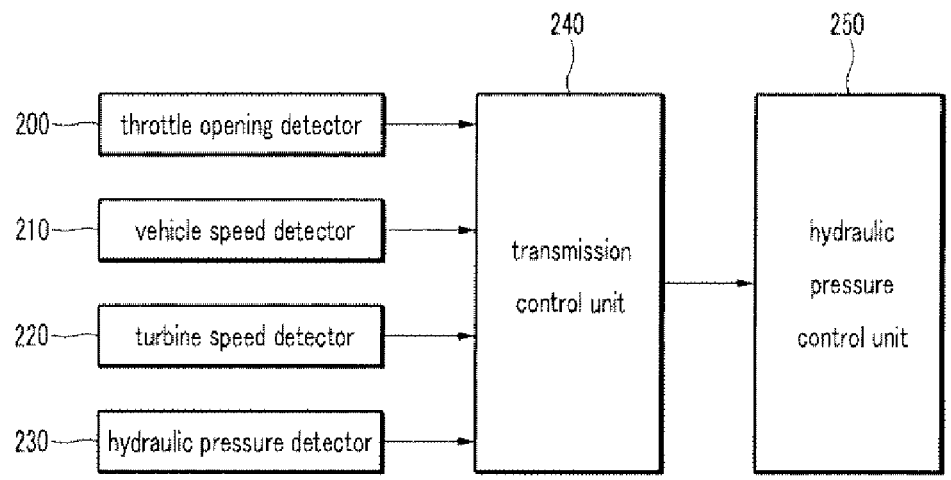
FIG. 4 is a block diagram of a system that performs a shift control method of an automatic transmission according to an exemplary embodiment of the present invention.

As shown in FIG. 4, a system that performs a shift control method of an automatic transmission according to an exemplary embodiment of the present invention includes a throttle opening detector 200, a vehicle speed detector 210, a turbine speed detector 220, a hydraulic pressure detector 230, a transmission control unit 240, and a hydraulic pressure control unit 250.

The throttle opening detector 200 detects a throttle opening that is operated in accordance with operation of the accelerator pedal, and transmits a signal corresponding thereto to the transmission control unit 240.

The vehicle speed detector 210 detects a vehicle speed and transmits a signal corresponding thereto to the transmission control unit 240.

The turbine speed detector 220 detects a current turbine speed operated as an input torque of the automatic transmission from an angular change of a crank shaft, and transmits a signal corresponding thereto to the transmission control unit 240.

The hydraulic pressure detector 230 detects hydraulic pressures applied to off-going and on-coming elements, and transmits a signal corresponding thereto to the transmission control unit 240.

The transmission control unit 240 may include a processor activated by a program that performs the inventive method. The transmission control unit 240 may also include a memory and associated hardware, software, and/or firmware as may be selected and programmed by a person of ordinary skill in the art based on the teachings herein.

The transmission control unit 240 generates a hydraulic pressure shift signal corresponding to the signals received from the sensors and transmits the hydraulic pressure shift signal to the hydraulic pressure control unit 240.

The throttle opening in accordance with the vehicle speed at each shift speed is stored in a map table in the transmission control unit 240. Therefore, the transmission control unit 240 calculates a target shift speed in accordance with the throttle opening signal and the vehicle speed signal, and determines whether a shifting condition is satisfied. In addition, a releasing pressure of an off-going element and an engaging pressure of an on-coming element at each shift speed are stored in the map table. A turbine speed at each shift speed is also stored in the map table.

Appropriate values of the throttle opening, engaging and releasing pressures, and turbine speed may be selected by a person of ordinary skill in the art, and may vary with vehicle and engine type.

The hydraulic pressure control unit 250 receives the hydraulic pressure shift signal from the transmission control unit 240 and controls hydraulic pressures applied to off-going and on-coming elements. The hydraulic pressure control unit 250 includes valves that control the hydraulic pressure applied to the off-going and on-coming elements.

Figure 5:
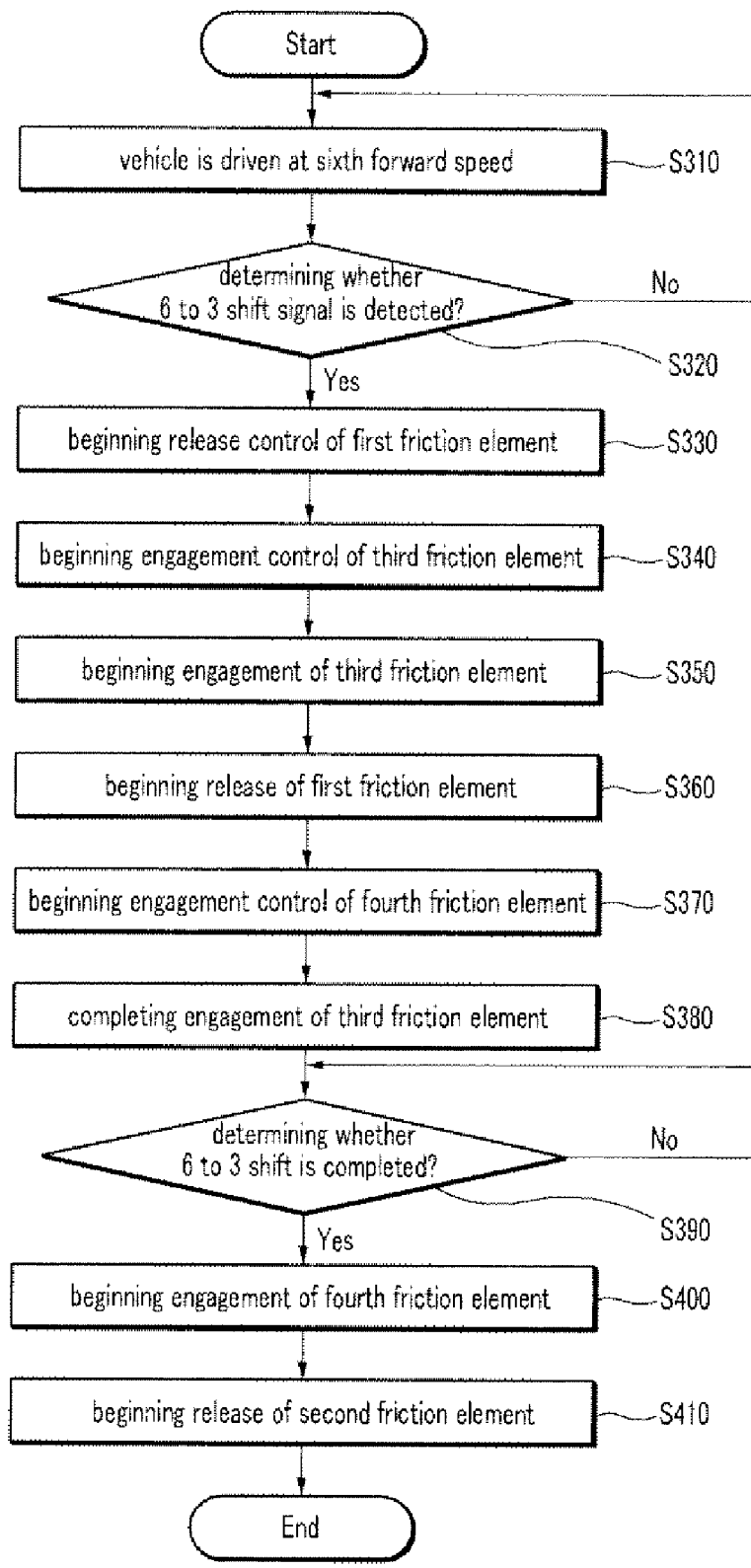
FIG. 5 is a flowchart showing a shift control method of an automatic transmission according to an exemplary embodiment of the present invention.

Referring to FIG. 5, a shift control method from sixth to third speed is described for purposes of example only. In this example, the sixth forward speed is achieved by engagement of first and second friction elements, and the third forward speed is achieved by engagement of third and fourth friction elements. The second frictional element is the variable frictional element.

As shown in FIG. 5, the vehicle is driven in the sixth forward speed at step S310. If the throttle opening in accordance with the vehicle speed is larger than or equal to a predetermined throttle opening, a sixth to third shift signal is detected.

It the transmission control unit 240 does not detect a shift signal, the vehicle continues to be driven in the sixth forward speed in step S310. If the transmission control unit 240 detects the 6 to 3 shift signal, the transmission control unit 230 begins release control of the first frictional element in step S330, and begins engagement control of the third frictional element in step S340 a time t1 later for smooth shifting.

Beginning of the release and engagement controls means that hydraulic pressure of each friction elements is started to be controlled. That is, the beginning of the release control of the frictional element means that hydraulic pressure of an off-going element is maintained at a specific value after being reduced by a constant slope or a varying slope. In addition, the beginning of the engagement control of the frictional element means that hydraulic pressure of an on-coming element is maintained at a stand-by pressure after being increased to a pre-charge pressure.

After that, when a current turbine speed reaches a first predetermined turbine speed X1, the transmission control unit 240 begins engagement of the third frictional element in step S350. In addition, when the current turbine speed reaches a second predetermined turbine speed X2, the transmission control unit 240 begins release of the first frictional element in step S360. The first predetermined turbine speed X1 may be 50% of a turbine speed in the third forward speed D3, and the second predetermined turbine speed X2 may be 80% of the turbine speed in the third forward speed D3.

Beginning of the engagement of the frictional element means that the frictional element is actually engaged, and the beginning of the release of the frictional element means that the frictional element is actually released. That is, the beginning of the engagement of the frictional element means that hydraulic pressure of the on-coming element that is maintained at the stand-by pressure begins to be increased. In addition, the beginning of the release of the frictional element means that hydraulic pressure of the off-going element begins to be reduced to zero.

During performing of the release of the first frictional element and the engagement of the third frictional element, the transmission control unit 240 begins an engagement control of the fourth frictional element in step S370 when the current turbine speed reaches a third predetermined turbine speed X3. The third predetermined turbine speed X3 may be a turbine speed of the fourth forward speed D4.

After that, the transmission control unit 240 completes the release of the first frictional element and the engagement of the third frictional element in step S380, and determines whether the 6 to 3 shift is complete in step S390.

If the 6 to 3 shift is complete at step S390, the transmission control unit 240 begins engagement of the fourth frictional element in step S400, and begins release control of the second frictional element in step S410. The second frictional element is the variable frictional element, and the release control of the second frictional element means that hydraulic pressure of the second frictional element is reduced to a neutral state. Since the variable frictional element has no effect on the output, shift shock does not occur if the variable frictional element is quickly released. Therefore, the second frictional element is quickly released such that shift time is shortened and shift responsiveness improves.

The 6 to 3 shift may be determined to be complete when a predetermined shift time Ts has passed since the 6 to 3 shift signal was inputted.

Figure 6:
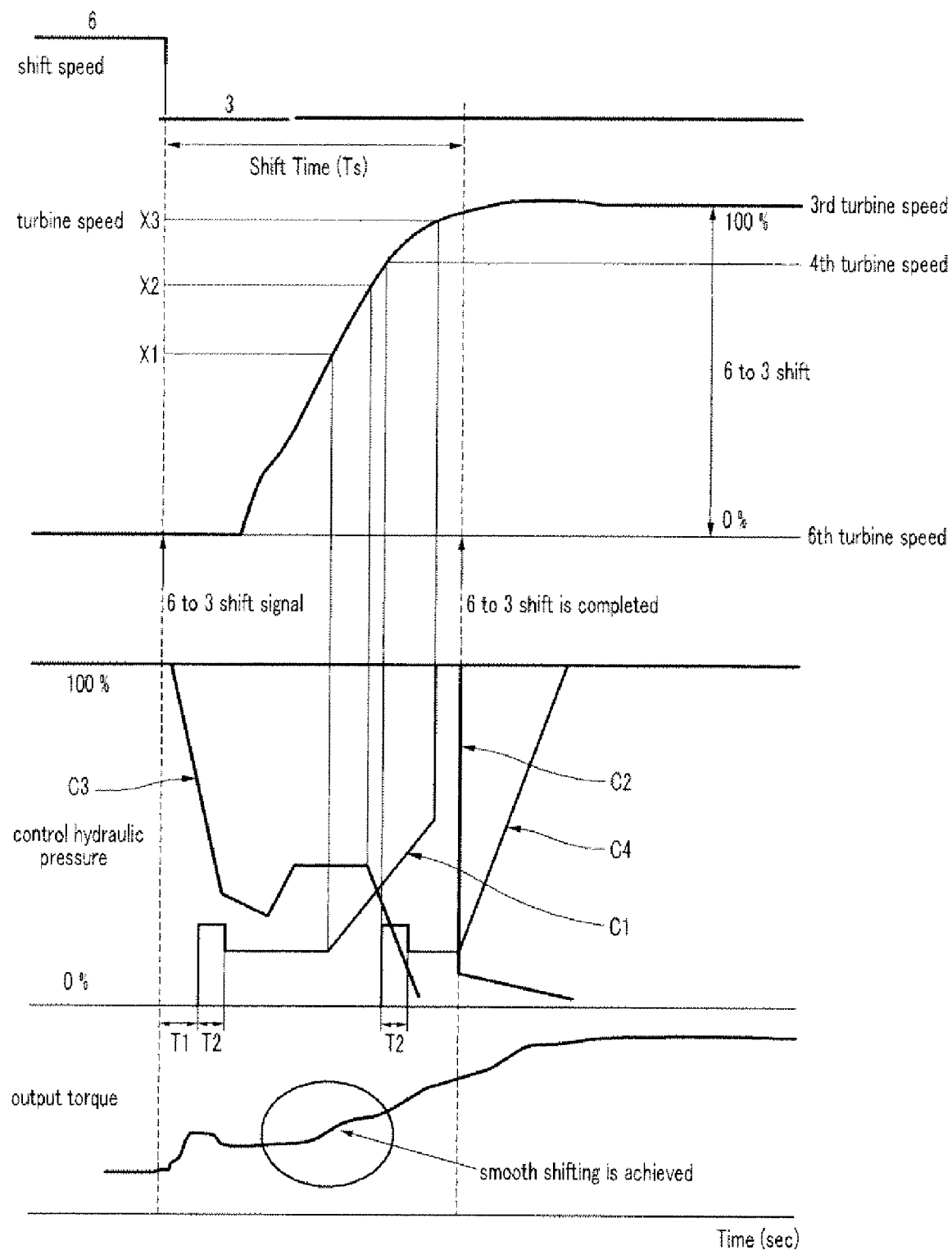
FIG. 6 is a graph showing a turbine speed, a control hydraulic pressure, and an output torque of an exemplary shift control method of an automatic transmission according to an embodiment of the present invention.

Referring to FIG. 6, for purposes of example, the first frictional element is the third clutch C3, the second frictional element is the second clutch C2, the third frictional element is the first clutch C1, and the fourth frictional element is the fourth clutch C4.

As shown in FIG. 6, in the sixth forward speed, the transmission control unit 240 receives the 6 to 3 shift signal, begins the release control of the first frictional element, and begins the engagement control of the third frictional element after the first predetermined time t1. That is, hydraulic pressure of the first frictional element is maintained at the specific value after being reduced by a predetermined slope and being increased to the specific value. In addition, hydraulic pressure of the third frictional element is quickly increased to the pre-charge pressure and is maintained for a second predetermined time t2. After that, hydraulic pressure of the third frictional element is reduced to the stand-by pressure and is maintained.

At this time, the transmission control unit 240 begins the engagement of the third frictional element when the current turbine speed is the same as the first predetermined turbine speed X1. That is, hydraulic pressure of the third frictional element is increased by a constant slope and is quickly increased.

In addition, the transmission control unit 240 begins the release of the first frictional element when the current turbine speed is the same as the second predetermined turbine speed X2. That is, hydraulic pressure of the first frictional element is reduced by a constant slope.

During performing of the engagement of the third frictional element and the release of the first frictional element, the transmission control unit 240 begins the engagement control of the fourth frictional element when the current turbine speed is the same as the third predetermined turbine speed X3. That is, hydraulic pressure of the fourth frictional element is reduced to the stand-by pressure and is maintained after being maintained at the precharge pressure for the second predetermined time t2. The engagement control of the fourth frictional element begins before the 6 to 3 shift is completed so as to improve shift responsiveness.

After that, the transmission control unit 240 determines whether the 6 to 3 shift is completed. The 6 to 3 shift is completed when the predetermined shift time Ts has passed since the 6 to 3 shift signal is inputted. The predetermined shift time Ts may be selected by a person of ordinary skill in the art, and may vary with engine type and transmission type.

If the 6 to 3 shift is completed, the transmission control unit 240 begins the release control of the second frictional element and begins the engagement of the fourth frictional element. That is, hydraulic pressure of the second frictional element is urgently reduced to the neutral state, and hydraulic pressure of the fourth frictional element is increased by a constant slope. If hydraulic pressure of the second frictional element is urgently reduced to the neutral state, shift time is shortened and control of hydraulic pressure is easy. Therefore, shift feel may improve.

According to an exemplary embodiment of the present invention, the release of the second frictional element and the engagement of the fourth frictional element are performed quickly after the $n^{th}$ to $(n-3)^{th}$ shift is completed by controlling hydraulic pressure of the first and third frictional element. Therefore, shift feel may improve.

In addition, since the engagement control of the fourth frictional element begins while controlling hydraulic pressure of the first and third frictional elements, shift time may be shortened and shift responsiveness may improve.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission for controlling a shift from an $n^{th}$ shift speed, achieved by engagement of a first and a second frictional element, to an $(n-3)^{th}$ shift speed, achieved by engagement of a third and a fourth frictional element, the method comprising:
   (a) beginning a release control of the first frictional element;
   (b) beginning a release control of the second frictional element after step (a) and after the shift is determined to be completed;
   (c) beginning an engagement control of the third frictional element; and
   (d) beginning an engagement control of the fourth frictional element after step (c); and
   wherein reducing hydraulic pressure of the second frictional element to a neutral state is performed after step (b); and
   wherein the shift is determined to be completed when a predetermined shifting time has passed since a shift signal from the $n^{th}$ shift speed to the $(n-3)^{th}$ shift speed was inputted.

2. The shift control method of claim 1, wherein step (c) begins after step (a) begins, further comprising:
   (e) actually engaging the third frictional element; and
   (f) beginning an actual release of the first frictional element after step (e).

3. The shift control method of claim 2, wherein step (a) begins when the shift signal from the $n^{th}$ shift speed to the $(n-3)^{th}$ shift speed is inputted.

4. The shift control method of claim 2, wherein step (c) begins when a first predetermined time has passed since the shift signal from the N shift speed to the N-3 shift speed was inputted.

5. The shift control method of claim 2, wherein step (e) begins when a current turbine speed reaches a predetermined turbine speed.

6. The shift control method of claim 2, wherein step (f) begins when a current turbine speed reaches a predetermined turbine speed.

7. The shift control method of claim 1, wherein step (d) begins when a current turbine speed reaches a predetermined turbine speed.

8. The shift control method of claim 7, wherein an actual engagement of the fourth frictional element begins when the shift is determined to be completed.

9. A shift control method of an automatic transmission for controlling a shift from an $n^{th}$ shift speed, achieved by engagement of a first and a second frictional element, to an $(n-3)^{th}$ shift speed, achieved by engagement of a third and a fourth frictional element, the method comprising:

(a) beginning a release control of the first frictional element;
(b) beginning an engagement control of the third frictional element after step (a);
(c) beginning an actual engagement of the third frictional element;
(d) beginning an actual release of the first frictional element after step (c);
(e) beginning an engagement control of the fourth frictional element after step (d); and
(f) beginning a release control of the second frictional element after step (e).

10. The shift control method of claim 9, further comprising:

(g) beginning an actual engagement of the fourth frictional element, wherein steps (f) and (g) are substantially simultaneous.

11. The shift control method of claim 10, wherein steps (f) and (g) begin when the shift is determined to be completed.

12. The shift control method of claim 9, further comprising beginning to reduce a hydraulic pressure of the second frictional element to a neutral state after step (f).

13. The shift control method of claim 12, wherein step (a) begins when the shift signal from the $n^{th}$ shift speed to the $(n-3)^{th}$ shift speed is inputted.

14. The shift control method of claim 12, wherein step (b) begins when a first predetermined time has passed since the shift signal was inputted.

15. The shift control method of claim 12, wherein step (c) begins when a current turbine speed reaches a predetermined turbine speed.

16. The shift control method of claim 12, wherein step (d) begins when a current turbine speed reaches a predetermined turbine speed.

17. The shift control method of claim 12, wherein step (e) begins when a current turbine speed reaches a predetermined turbine speed.

* * * * *